(12) United States Patent
Ogawa

(10) Patent No.: US 8,657,085 B2
(45) Date of Patent: Feb. 25, 2014

(54) AIR DAMPER

(75) Inventor: Atsushi Ogawa, Columbus, OH (US)

(73) Assignee: Nifco Inc., Yokohama-Shi (JP)

(*) Notice: Subject to any disclaimer, the term of this patent is extended or adjusted under 35 U.S.C. 154(b) by 118 days.

(21) Appl. No.: 13/261,006

(22) PCT Filed: May 12, 2010

(86) PCT No.: PCT/JP2010/058053
§ 371 (c)(1),
(2), (4) Date: Jan. 9, 2012

(87) PCT Pub. No.: WO2010/131682
PCT Pub. Date: Nov. 18, 2010

(65) Prior Publication Data
US 2012/0118689 A1     May 17, 2012

(30) Foreign Application Priority Data
May 14, 2009 (JP) .................... 2009-117918

(51) Int. Cl.
*F16F 9/36* (2006.01)
(52) U.S. Cl.
USPC .................. 188/322.18; 188/322.15
(58) Field of Classification Search
USPC .......... 188/288, 300, 322.18, 322.22, 322.15; 267/64.12, 120
See application file for complete search history.

(56) References Cited

U.S. PATENT DOCUMENTS

| | | | | |
|---|---|---|---|---|
| 1,254,024 A | * | 1/1918 | Bryan | 417/513 |
| 2,753,957 A | * | 7/1956 | Dillenburger et al. | 188/317 |
| 4,632,371 A | * | 12/1986 | Wirges et al. | 267/64.28 |
| 5,104,098 A | * | 4/1992 | Kaneko | 267/64.11 |
| 5,697,477 A | * | 12/1997 | Hiramoto et al. | 188/322.18 |
| 7,293,634 B2 | * | 11/2007 | Rova | 188/281 |

FOREIGN PATENT DOCUMENTS

| | | |
|---|---|---|
| JP | S57-059237 | 4/1982 |
| JP | S57-079208 | 5/1982 |
| JP | H01-133537 | 5/1989 |
| JP | H08-105481 | 4/1996 |
| JP | 2000-282745 | 10/2000 |
| JP | 2001-152736 | 6/2001 |
| JP | 2006-052848 | 2/2006 |
| JP | 2008-151294 | 7/2008 |

* cited by examiner

Primary Examiner — Christopher Schwartz
(74) Attorney, Agent, or Firm — Manabu Kanesaka

(57) ABSTRACT

An air damper capable of stabilizing a damping force of the air damper is obtained.
When a rod member (16) is pulled out of a cylinder member (20), a suction member (60) hits against the other side surface (56) of a piston member (30) so as to close an air passage (28), and an airflow path communicating between an air chamber (26) and an outside is only orifice portions (42). On the other hand, when the rod member (16) is pushed into the cylinder member (20), the suction member (60) moves away from the other side surface (56) of the piston member (30) so as to open the air passage (28). Consequently, compared to a conventional structure in which an O-ring rolls by a friction force with an inner peripheral surface of a cylinder so as to open or close the air passage, the air passage (28) can be opened and closed as intended so as to be capable of stabilizing the damping force.

9 Claims, 16 Drawing Sheets

AIR DAMPER

RELATED APPLICATIONS

The present application is National Phase of International Application No. PCT/JP2010/058053 filed May 12, 2010, and claims priority from Japanese Application No. 2009-117918, filed May 14, 2009.

TECHNICAL FIELD

The present invention relates to an air damper for carrying out damping by allowing air in an air chamber inside a cylinder to flow through an orifice by relatively moving a piston inside the cylinder.

BACKGROUND ART

In an air damper described in Patent Document 1 (Japanese Patent Publication No. H08-105481), there is provided a piston movable inside the cylinder. Then, in the piston, there is formed an orifice allowing air in the air chamber inside the cylinder to flow in and out.

Moreover, in a concave portion formed in an outer peripheral surface of the piston, there is disposed an O-ring sealing the piston and an inner peripheral surface of the cylinder. Then, on a bottom surface of the concave portion, there is provided an air passage which is closed by the O-ring rolling toward one direction inside the concave portion by a friction force with the inner peripheral surface of the cylinder when the piston is pulled out of the cylinder, and which is opened by the O-ring rolling toward the other direction inside the concave portion by the friction force with the inner peripheral surface of the cylinder when the piston is pushed into the cylinder.

Due to the structure, when the piston is pulled out of the cylinder, a damping force by the air damper is exerted, and when the piston is pushed into the cylinder, the damping force by the air damper diminishes.

DISCLOSURE OF THE INVENTION

Problems to be Solved by the Invention

However, according to a conventional structure, the O-ring rolls inside the concave portion by the friction force with the inner peripheral surface of the cylinder, so that the air passage is closed or opened. However, the friction force between the O-ring and the inner peripheral surface of the cylinder does not stay constant over an entire periphery, and there is a possibility that the O-ring rolling inside the concave portion is deformed, and the damping force of the air damper is not stabilized.

The present invention is made in view of the aforementioned fact, and an object of the present invention is to stabilize the damping force of the air damper.

Means for Solving the Problems

An air damper of a first aspect of the present invention comprises a cylinder-shaped cylinder member with a bottom; a piston member movably provided in an inside of the cylinder member to form an air chamber between the piston member and a bottom plate of the cylinder member, wherein an orifice portion communicating the air chamber and an outside, and an air passage are formed; a seal member disposed in a concave portion formed in an outer periphery of the piston member, and sealing the piston member and an inner peripheral surface of the cylinder member; a rod member passing through the air passage formed in the piston member; a push-in portion provided in the rod member, and hitting against the piston member when the rod member is pushed in toward the bottom plate of the cylinder member, to thereby move the piston member toward the bottom plate of the cylinder member; and a suction member provided in an end portion of the rod member, closing the air passage by hitting against the piston member when the rod member is pulled out of the cylinder member, and opening the air passage by moving away from the piston member when the push-in portion moves the piston member toward the bottom plate of the cylinder member by pushing the rod member into the cylinder member.

According to the structure, when the rod member is pulled out of the cylinder member, the suction member provided in the end portion of the rod member hits against the piston member so as to close the air passage. On the other hand, when the rod member is pushed into the cylinder member, the push-in portion moves the piston member toward the bottom plate of the cylinder member. Thereby, the suction member moves away from the piston member so as to open the air passage.

Also, the seal member disposed in the concave portion formed in the outer periphery of the piston member seals the piston member and the inner periphery surface of the cylinder member.

Thereby, when the rod member is pulled out of the cylinder member, air in the air chamber inside the cylinder member and air of the outside flow through only the orifice portion. Consequently, a damping force is exerted. On the other hand, when the rod member is pushed into the cylinder member, air in the air chamber inside the cylinder member and air of the outside flow through the orifice portion and the air passage. Consequently, the damping force diminishes.

Here, by hitting the suction member against the piston member, the air passage is closed, and by moving the suction member away from the piston member, the air passage is opened. Consequently, compared to a conventional structure in which the O-ring rolls by the friction force with the inner peripheral surface of the cylinder so as to open or close the air passage, the air passage can be opened and closed as intended so as to be capable of stabilizing the damping force.

In the aspect, the piston member is constituted by a plurality of components so as to be capable of being assembled from an external side of the rod member.

According to the structure, the piston member is constituted by a plurality of the components so as to be capable of being assembled from the external side of the rod member. Consequently, the piston member can be easily assembled to the rod member.

In the aspect, a cross-sectional surface of the seal member is circular, and an inner width size of the concave portion in which the seal member with the circular cross-sectional surface is disposed is made longer than a diameter of the seal member for a crushing portion of the seal member.

According to the structure, the inner width size of the concave portion is made longer than the diameter size of the seal member for the crushing portion of the seal member. Consequently, a crushed shape of the seal member is stabilized so as to be capable of reliably sealing the piston member and the inner peripheral surface of the cylinder member.

In the aspect, the seal member is the O-ring.

According to the structure, the seal member is the O-ring, so that a general-purpose product can be used as the seal member.

In the aspect, the rod member comprises a band portion in which a plurality of connecting components is mutually connected so as to be capable of swaying.

According to the structure, the rod member comprises the band portion in which a plurality of the connecting components is mutually connected so as to be capable of swaying. Consequently, when the band portion of the rod member is pushed into the cylinder member, a degree of freedom in a push-in direction of the band portion can be improved.

In the aspect, the rod member comprises an elastic deformation portion which can elastically deform in a curved shape in a determined direction.

According to the structure, the rod member comprises the elastic deformation portion which can elastically deform in the curved shape in the determined direction. Consequently, the air damper can be disposed in such a way that the elastic deformation portion deforms in the curved shape in the determined direction, so that a degree of freedom of a placement of the air damper can be improved.

Effect of the Invention

According to the present invention, the damping force of the air damper can be stabilized.

EMBODIMENTS FOR CARRYING OUT THE INVENTION

A glove box in which one example of an air damper according to a first embodiment of the present invention is adopted, and the air damper will be explained in accordance with FIGS. 1A to 7.

(Overall Structure)

Figure 7:
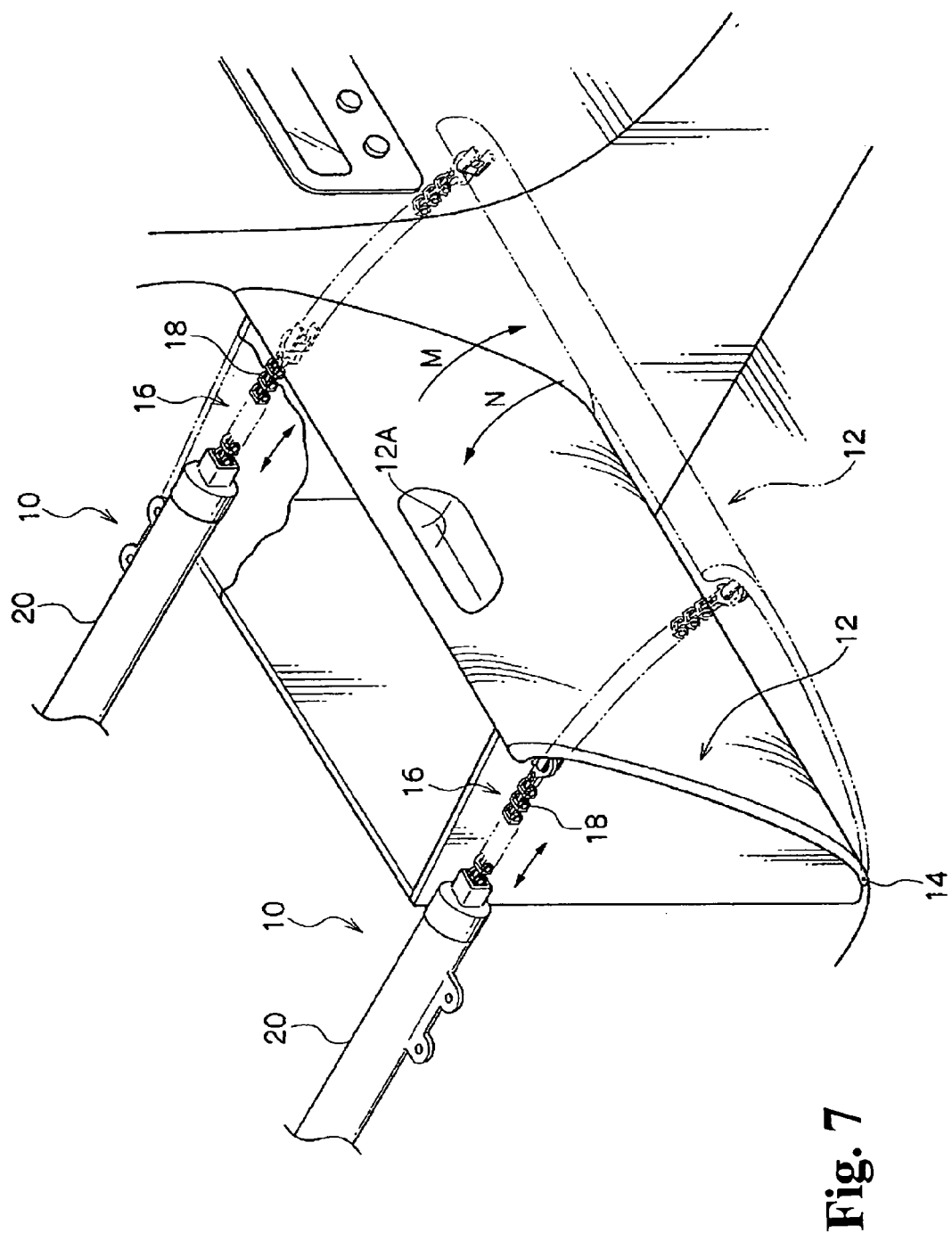
FIG. 7 is a perspective view showing a glove box in which the air damper according to the first embodiment of the present invention is used.

As shown in FIG. 7, a glove box 12 in which an air damper 10 is adopted is placed in a vehicle interior of an automobile, and provided in front of a front passenger seat. Then, the glove box 12 comprises a rotational shaft portion 14 rotatably supporting the glove box 12 on one end side. Moreover, on the other end side of the glove box 12, one end of a rod member 16 of the air damper 10 fixed to a vehicle body by a bracket, which is not shown in the figures, is fixed.

Also, the glove box 12 is engaged with the vehicle body by an engaging device which is not shown in the figures, and by griping a grip portion 12A of the glove box 12, the engaging device is released. Moreover, the glove box 12 wherein the engaging device is released rotates with a focus on the rotational shaft portion 14 under one's own weight. Then, the glove box 12 is disposed so as to be opened.

(Structure of Essential Portions)

Next, the air damper 10 will be explained.

Figure 6A:
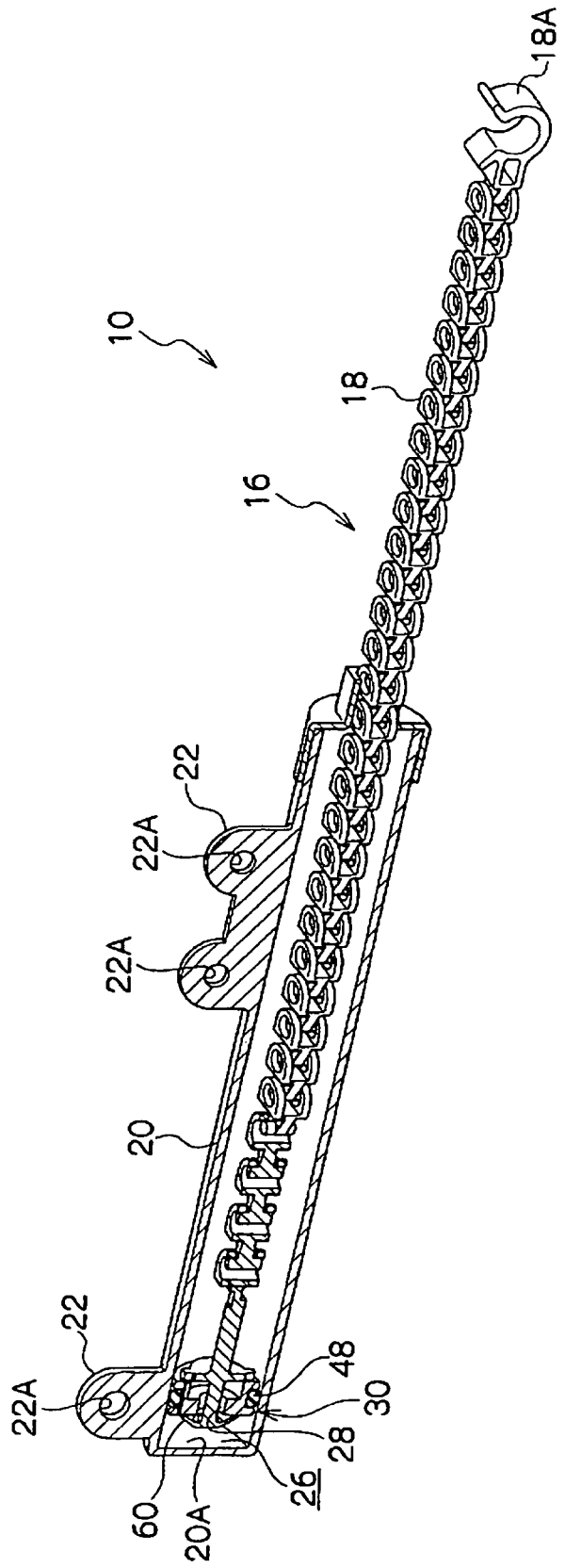
FIG. 6A is a partial cross-sectional view showing the air damper according to the first embodiment of the present invention.
Figure 6B:
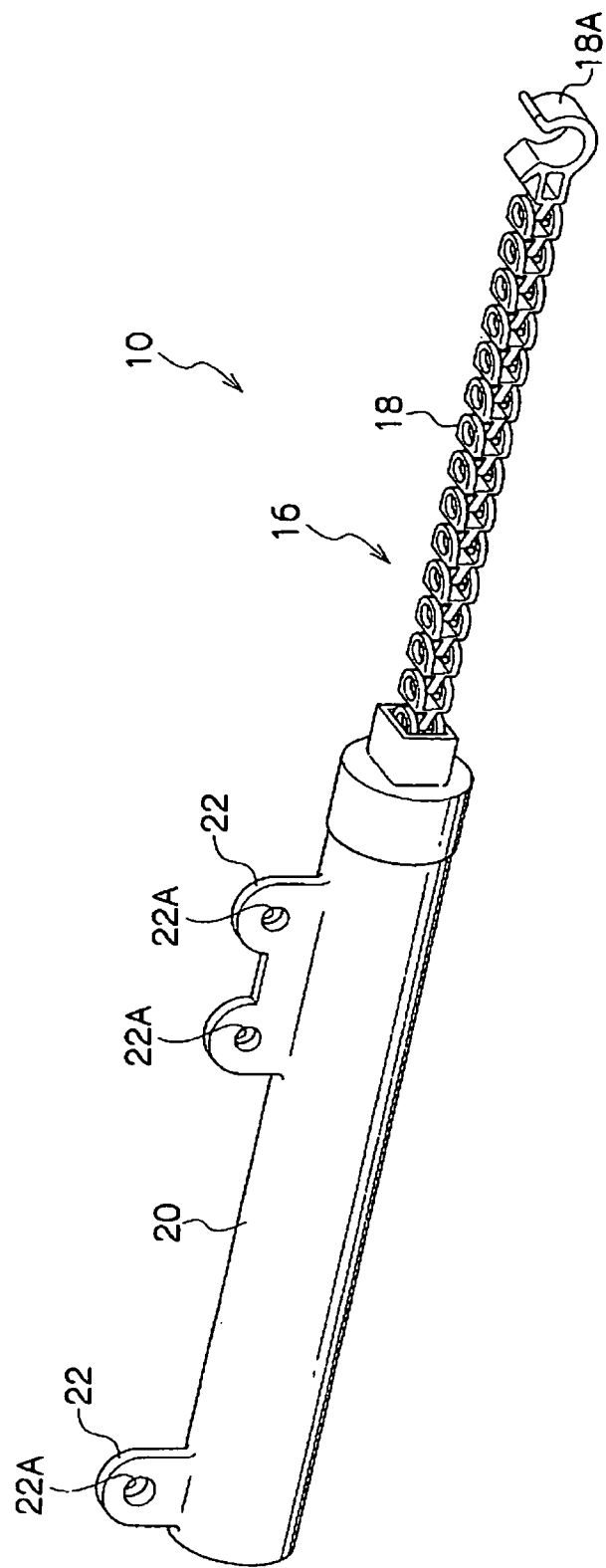
FIG. 6B is a perspective view showing the air damper according to the first embodiment of the present invention.

As shown in FIGS. 6A and 6B, the air damper 10 comprises a cylinder member 20 with a bottom. Then, on an outer peripheral surface of the cylinder member 20, there are integrally formed attachment portions 22 comprising attachment holes 22A attaching the cylinder member 20 to the bracket provided in the vehicle body.

On the other hand, in an inside of the cylinder member 20, there is provided the rod member 16 taken in and out from the inside of the cylinder member 20. Then, a locking portion 18A provided in one end portion of the rod member 16 is locked in the glove box 12. Moreover, the rod member 16 comprises a band portion 18 which is taken in and out from the cylinder member 20. Then, the band portion 18 is constituted such that a plurality of connecting components 24 is mutually connected so as to be capable of swaying.

Figure 5A:
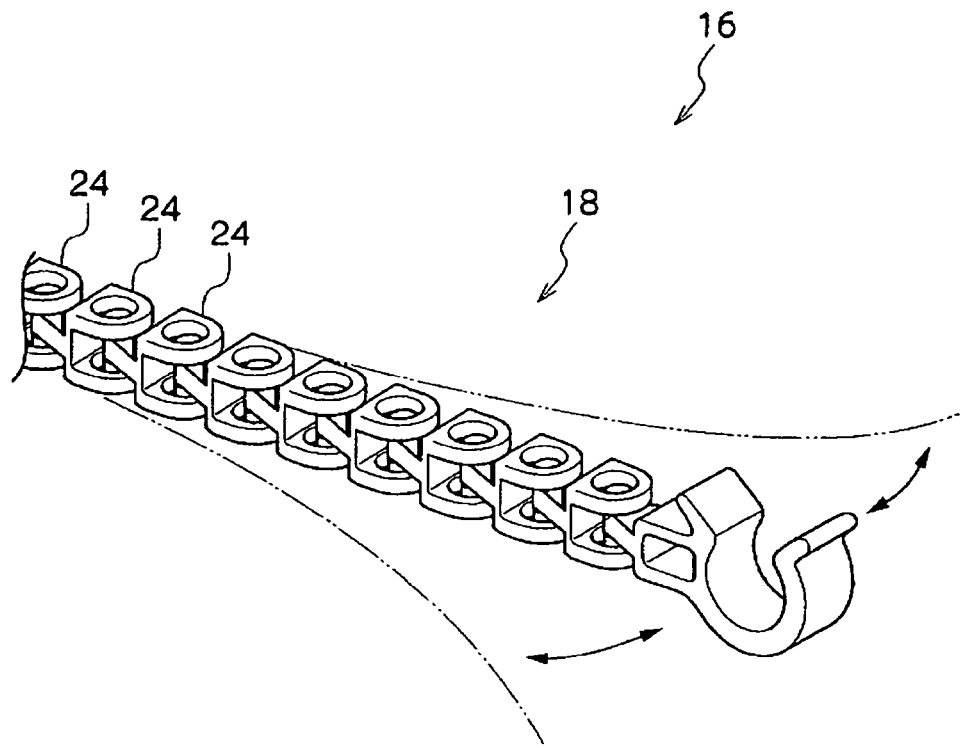
FIG. 5A is a perspective view showing a band portion of the rod member adopted in the air damper according to the first embodiment of the present invention.
Figure 5B:
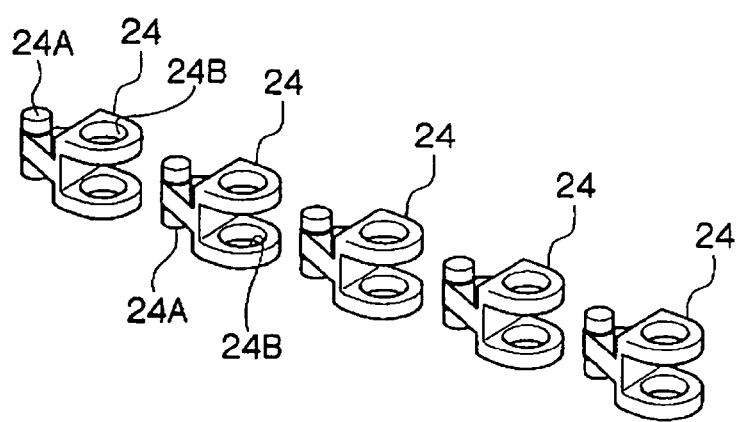
FIG. 5B is an exploded perspective view showing the band portion of the rod member adopted in the air damper according to the first embodiment of the present invention.

More specifically, as shown in FIGS. 5A and 5B, in the connecting components 24 constituting the band portion 18, there are provided columnar pin portions 24A, and shaft supporting portions 24B supporting the pin portions 24A of the adjacent connecting components 24 so as to be capable of swaying. Due to the structure, the pin portions 24A of the adjacent connecting components 24 are supported by axes on the shaft supporting portions 24B. Thereby, as shown in FIG. 5A, the band portion 18 exposed from the cylinder member 20 can freely sway in a curved line.

Figure 2:
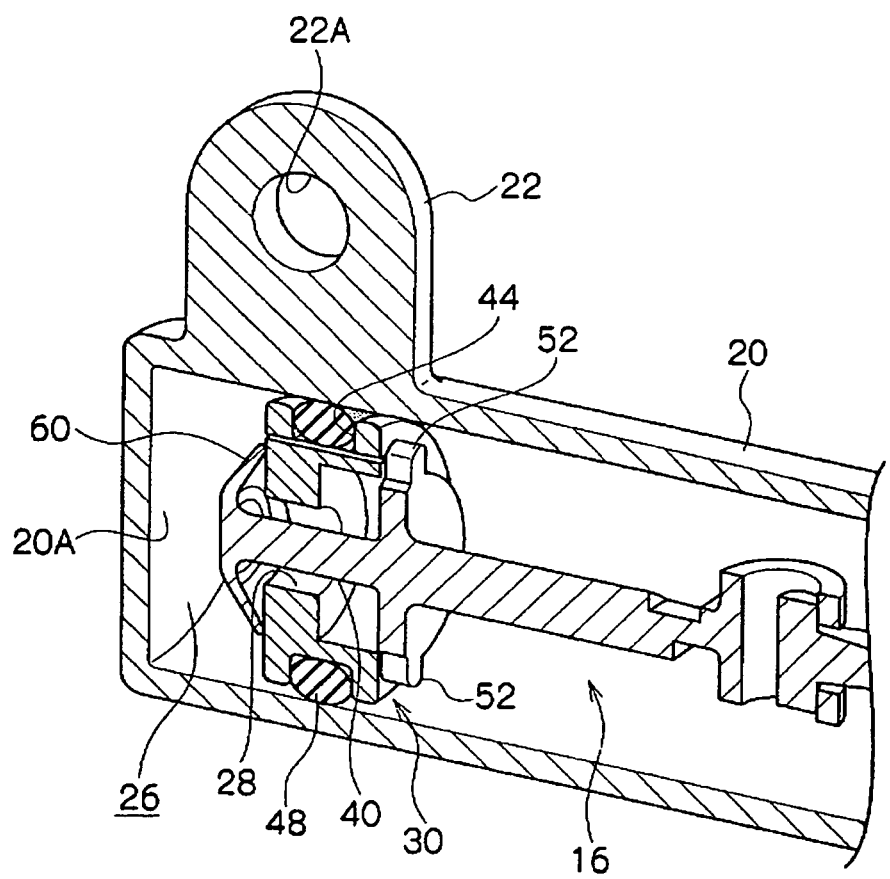
FIG. 2 is a cross-sectional view showing the air damper according to the first embodiment of the present invention.

Moreover, as shown in FIG. 2, inside the cylinder member 20 and on the other end side of the rod member 16, there is provided a piston member 30 forming an air chamber 26 between the piston member 30 and a bottom plate 20A of the cylinder member 20. In the piston member 30, there is formed a circular air passage 28 in which the rod member 16 is inserted and passes through. Moreover, the piston member 30 is provided so as to be capable of moving inside the cylinder member 20.

Figure 3A:
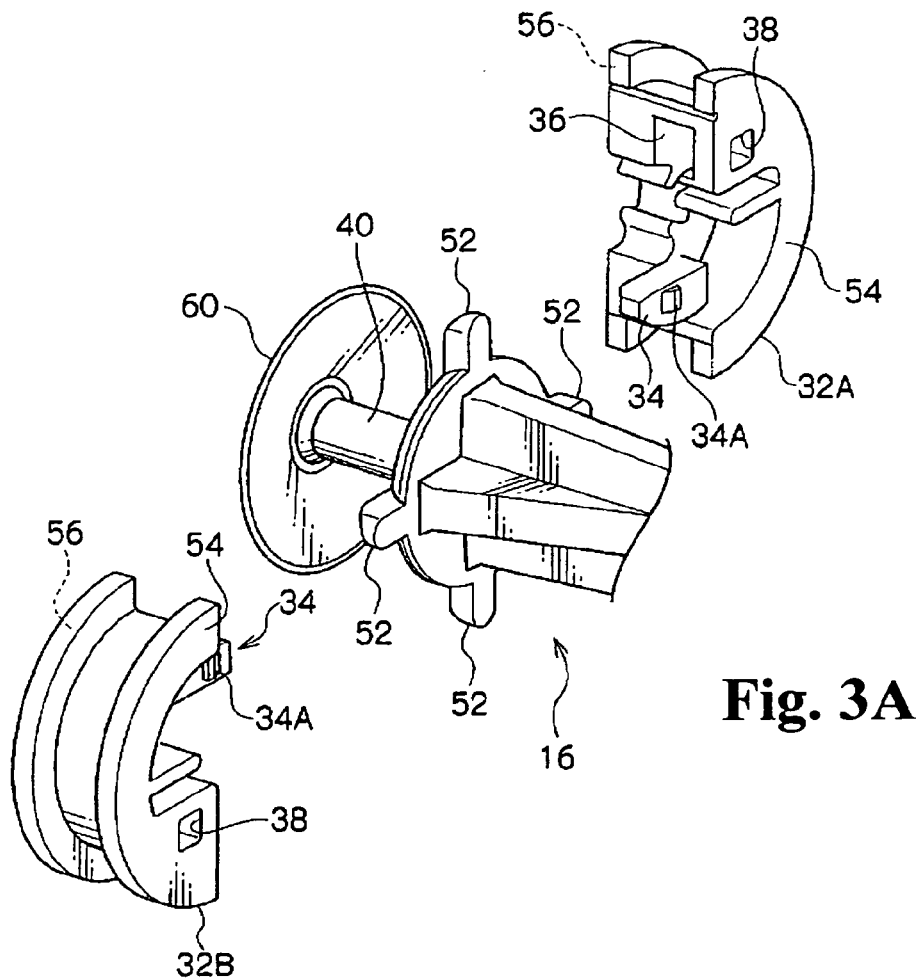
FIG. 3A is an exploded perspective view showing a piston member, a rod member, and the like which are adopted in the air damper according to the first embodiment of the present invention.

More specifically, as shown in FIG. 3A, a columnar insertion-passing portion 40 provided in the rod member 16 is inserted and passes through the air passage 28 (see FIG. 2) provided in the piston member 30. Then, the piston member 30 (see FIG. 2) comprising the air passage 28 is constituted by one member 32A and the other member 32B which are approximately semicircular. Also, one member 32A and the other member 32B are divided into two in an orthogonal direction (hereinafter, simply called the "orthogonal direction") orthogonal relative to a moving direction (hereinafter, simply called the "moving direction") of the piston member 30.

Then, in one member 32A and the other member 32B, there are integrally formed protruding portions 34 comprising triangle claws 34A in such a way as to protrude toward the other member 32B side or one member 32A side (the other side). Moreover, insertion openings 36, in which the protruding portions 34 provided on the other side are inserted, are formed in one member 32A and the other member 32B. Also, locking openings 38, formed in such a way as to pass inside the insertion openings 36 from the moving direction, are provided in one member 32A and the other member 32B.

Then, the triangle claws 34A of the protruding portions 34 inserted into the insertion openings 36 are hooked into edge portions of the locking openings 38 so as to have a structure that one member 32A and the other member 32B are assembled.

Figure 4A:
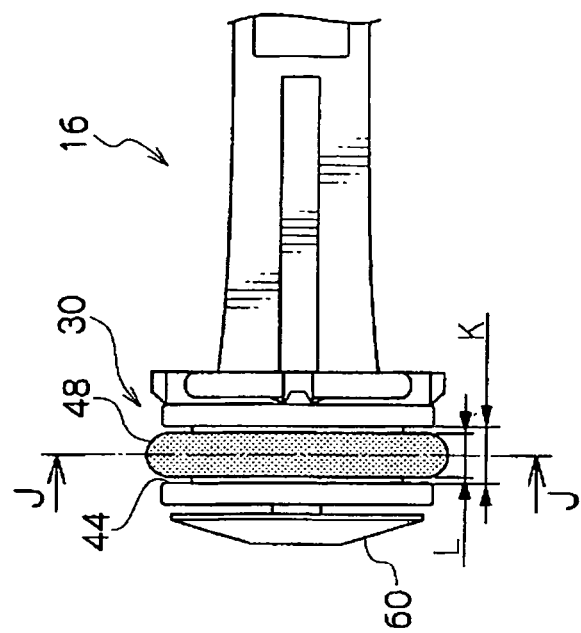
FIG. 4A is a side view showing the piston member, the rod member, an O-ring, and the like which are adopted in the air damper according to the first embodiment of the present invention.
Figure 4B:
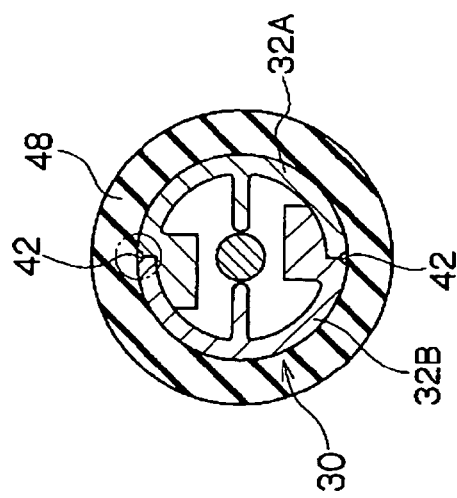
FIG. 4B is a cross-sectional view showing the piston member, the rod member, the O-ring, and the like which are adopted in the air damper according to the first embodiment of the present invention.
Figure 4C:
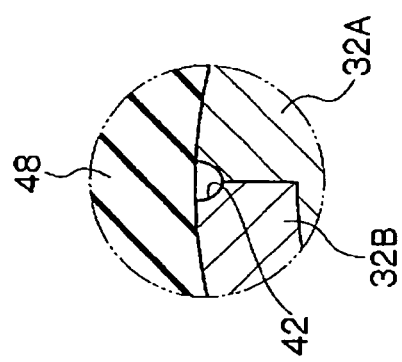
FIG. 4C is an enlarged cross-sectional view showing the piston member and the O-ring which are adopted in the air damper according to the first embodiment of the present invention.

Moreover, in FIGS. 4B and 4C, a cross-sectional surface J to J of the piston member 30 shown in FIG. 4A is shown. As shown in FIGS. 4B and 4C, in a joint between one member 32A and the other member 32B, there are provided orifice portions 42 passing through the front and back of the piston member 30. Then, the orifice portions 42 narrow down an airflow path between air in the air chamber 26 and air outside.

Figure 3B:
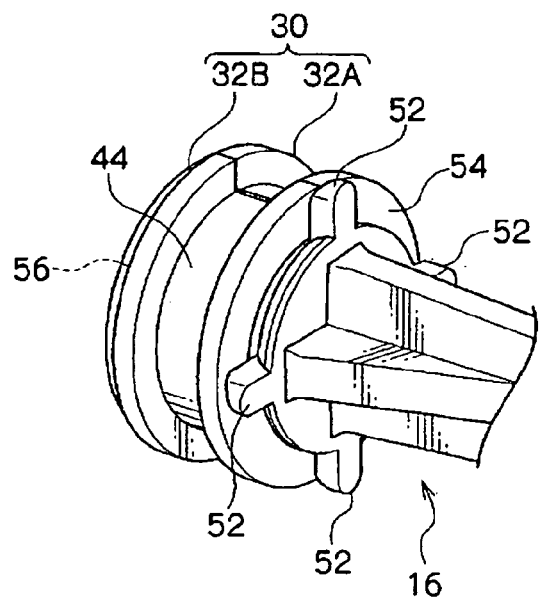
FIG. 3B is an enlarged perspective view showing the piston member, the rod member, and the like which are adopted in the air damper according to the first embodiment of the present invention.

Also, as shown in FIG. 3B, on an outer periphery of the cylinder member 20, a concave-like concave portion 44 is provided over an entire periphery. Moreover, as shown in FIG. 4A, in the concave portion 44, an O-ring 48 whose cross-sectional surface is circular is disposed as a seal member sealing between the piston member 30 and an inner peripheral surface of the cylinder member 20 by being crushed. Here, an inner width size (K size shown in FIG. 4A) of the concave portion 44 is made longer than a diameter size (L size shown in FIG. 4A) of the O-ring 48 for a crushing portion of the O-ring 48.

Moreover, as shown in FIGS. 3A and 3B, in the rod member 16, four pieces of push-in portions 52, which hit against the piston member 30 when the rod member 16 is pushed in toward the bottom plate 20A of the cylinder member 20 so as to move the piston member 30 toward the bottom plate 20A of the cylinder member 20, are provided in such a way as to extend outward in a radial direction.

More specifically, the push-in portions 52 hit against one side surface 54 facing the moving direction of the piston member 30 so as to move the piston member 30 toward the bottom plate 20A. Also, even if the push-in portions 52 hit against one side surface 54, an external shape of the push-in portions 52 is designed such that air in the air chamber 26 outflows to the outside through the air passage 28.

On the other hand, on the other end portion of the rod member 16, there is provided a suction member 60 closing the air passage 28 by hitting against the other side surface 56 of the piston member 30 when the rod member 16 is pulled out of the cylinder member 20.

Figure 1A:
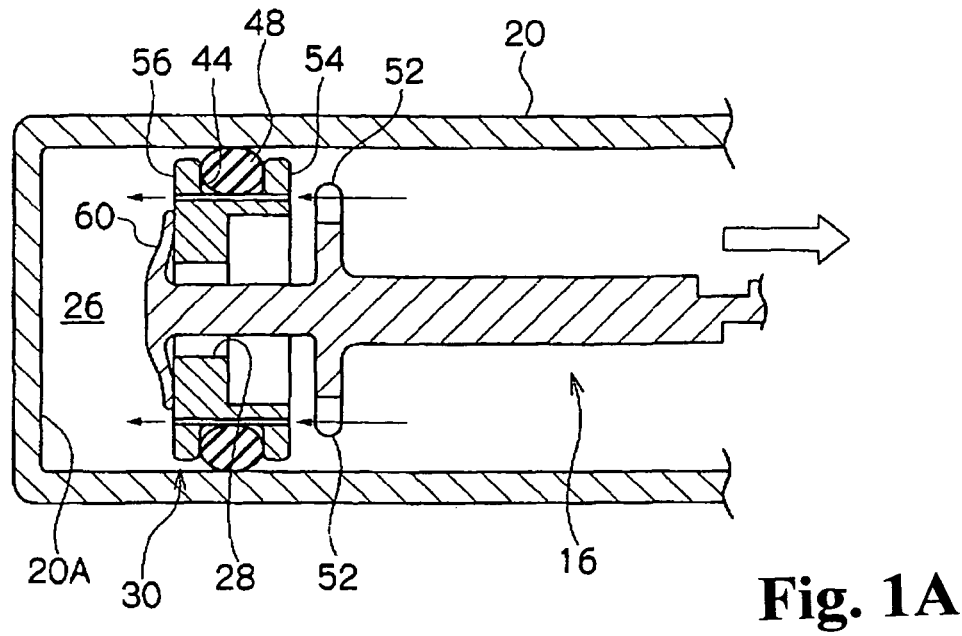
FIG. 1A is a cross-sectional view showing an air damper according to a first embodiment of the present invention.
Figure 1B:
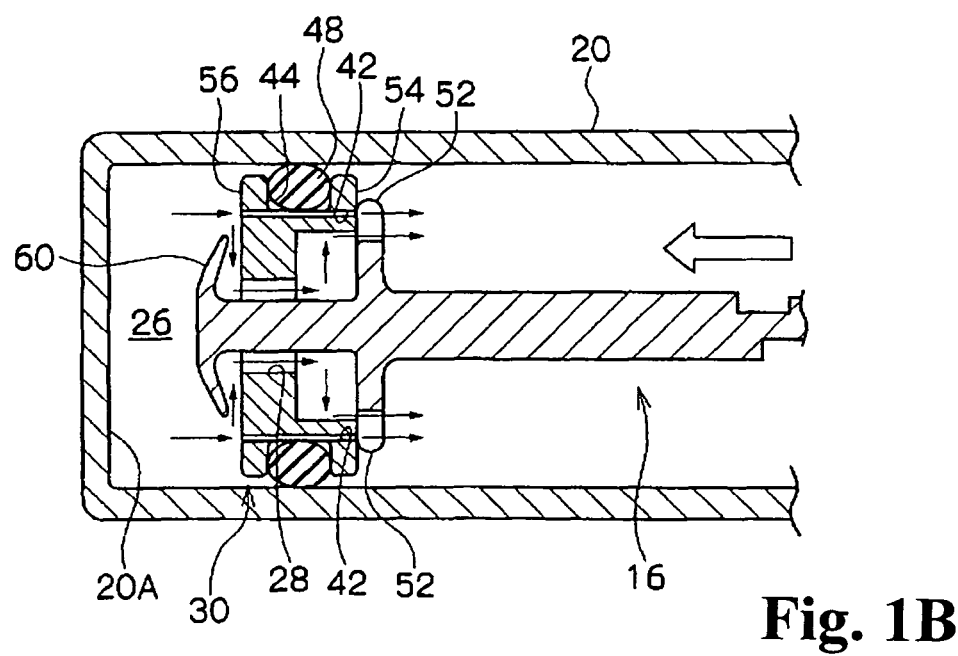
FIG. 1B is a cross-sectional view showing the air damper according to the first embodiment of the present invention.

More specifically, as shown in FIG. 1A, the suction member 60 closes the air passage 28 by hitting against the other side surface 56 of the piston member 30 when the rod member 16 is pulled out of the cylinder member 20. Thereby, the airflow path communicating between the air chamber 26 and the outside is only the orifice portions 42. On the other hand, as shown in FIG. 1B, when the push-in portions 52 move the piston member 30 toward the bottom plate 20A of the cylinder member 20 by pushing the rod member 16 into the cylinder member 20, the suction member 60 moves away from the other side surface 56 of the piston member 30 so as to open the air passage 28.

(Operation and Effect)

Next, an operation and effect of the air damper 10 will be explained.

As shown in FIG. 7, when the glove box 12 of the automobile is attempted to be opened, a user grips the grip portion 12A of the glove box 12, and releases the engaging device (omitted from the figures) engaging the glove box 12 and the vehicle body. When the engaging device is released, the glove box 12 moves in an arrow M direction under one's own weight, so that the glove box 12 is opened. When the glove box 12 is opened, the rod member 16 fixed to the other end side of the glove box 12 is pulled out of the cylinder member 20 fixed to the vehicle body.

More specifically, the band portion 18 of the rod member 16 is pulled out of the cylinder member 20. Then, the band portion 18 is pulled out of the cylinder member 20 in such a way as to follow along a rotational trace of the glove box 12 while the band portion 18 is deforming in the curved line.

As shown in FIG. 1A, when the rod member 16 is pulled out of the cylinder member 20, the suction member 60 hits against the other side surface 56 of the piston member 30 so as to close the air passage 28. Thereby, the airflow path communicating between the air chamber 26 and the outside is only the orifice portions 42.

Specifically, air in the air chamber 26 inside the cylinder member 20 and air outside flow through only the orifice portions 42. Consequently, a damping force is exerted due to a flow resistance of air passing through the orifice portions 42. Consequently, the glove box 12 opening under one's own weight is slowly opened and halts at a predetermined position due to a stopper which is not shown in the figures.

As shown in FIG. 7, when the glove box 12 (the glove box shown by chain double-dashed lines) which has halted in an open state is attempted to be closed, a user pushes an outside surface of the glove box 12, which is opened under its own weight, toward an arrow N direction in order to engage the glove box 12 with the vehicle body. When the user pushes the glove box 12 toward the arrow N direction in order to close the glove box 12, the band portion 18 of the rod member 16 is pushed into the cylinder member 20.

As shown in FIG. 1B, when the rod member 16 is pushed into the cylinder member 20, the push-in portions 52 formed in the rod member 16 hit against one side surface 54 of the piston member 30 so as to press the piston member 30. Thereby, the piston member 30 moves toward the bottom plate 20A. Also, the suction member 60 moves away from the other side surface 56 of the piston member 30 so as to open the air passage 28. Thereby, air in the air chamber 26 flows to the outside through the air passage 28 and the orifice portions 42.

Specifically, air in the air chamber 26 inside the cylinder member 20 and outside air flow through the air passage 28 and the orifice portions 42. Consequently, the flow resistance of the air becomes smaller compared to a case flowing through only the orifice portions 42. Thereby, the glove box 12, wherein the damping force of the air damper 10 is diminished so as to be opened under its own weight, is closed by a pressing force of the user.

Thus, in the structure, the air passage 28 is closed by hitting the suction member 60 against the other side surface 56 of the piston member 30. Also, in the structure, the air passage 28 is opened by moving the suction member 60 away from the other side surface 56 of the piston member 30. Consequently, compared to a conventional structure in which an O-ring rolls by a friction force with an inner peripheral surface of a cylinder so as to open or close an air passage, the air passage 28 can be opened and closed as intended so as to be capable of stabilizing the damping force.

Also, the piston member 30 is constituted by one member 32A and the other member 32B which are approximately semicircular, and divided into two in the orthogonal direction. Thereby, one member 32A and the other member 32B can be assembled from an external side of the insertion-passing portion 40 of the rod member 16. Consequently, the piston member 30 can be easily assembled to the rod member 16.

Also, the inner width size of the concave portion 44 wherein the O-ring 48 is disposed is made longer than the diameter size of the O-ring 48 for the crushing portion of the O-ring 48. Consequently, a crushed shape of the O-ring 48 is stabilized so as to be capable of reliably sealing the piston member 30 and the inner peripheral surface of the cylinder member 20.

Also, by using the O-ring 48 for the seal member sealing the piston member 30 and the inner peripheral surface of the cylinder member 20, a general-purpose product can be used as the seal member.

Also, the rod member 16 comprises the band portion 18 in which a plurality of the connecting components 24 is mutually connected so as to be capable of swaying. Consequently, when the band portion 18 of the rod member 16 is pushed into the cylinder member 20, a degree of freedom in a push-in direction of the band portion 18 can be improved.

Incidentally, although a specific embodiment of the present invention has been explained in detail, the present invention is not limited to such embodiment, and it is obvious for those skilled in the art that the other various embodiments can be made within a range of the present invention. For example, in the aforementioned embodiment, in order to damp an opening movement of the glove box 12, two pieces of the air damper 10 are used. However, the air damper 10 is not limited to the two pieces, and the air damper may be one piece, or three pieces or more.

Also, in the embodiment, although it is not described specifically, an opening area of the orifice portions 42 may be changed so as to change a damping characteristic of the glove box 12.

Also, in the embodiment, although it is not described specifically, the suction member 60 is integrally molded with the rod member 16 by an injection molding, and additionally, one member 32A and the other member 32B constituting the piston member 30 are molded by the injection molding, so that shapes of the suction member 60 and the piston member 30 are stabilized. Thereby, opening and closing of the air passage 28 can be carried out as intended.

Also, in the embodiment, the piston member 30 is constituted by one member 32A and the other member 32B which are approximately semicircular, and divided into two in the orthogonal direction. However, the piston member 30 is not specially limited to the above, and may be divided into three or more provided that the piston member 30 can be assembled from an external side of the rod member 16.

Also, in the embodiment, one example in which the air damper 10 is used in the glove box 12 has been explained. However, the air damper 10 may be used in, for example, another opening and closing cover such as an opening and closing cover and the like of an operating panel of TV and the like.

Next, one example of the air damper according to a second embodiment of the present invention will be explained in accordance with FIGS. 8A and 8B. Incidentally, the same symbols are assigned to the same members as the first embodiment, and their explanations are omitted.

Figure 8A:
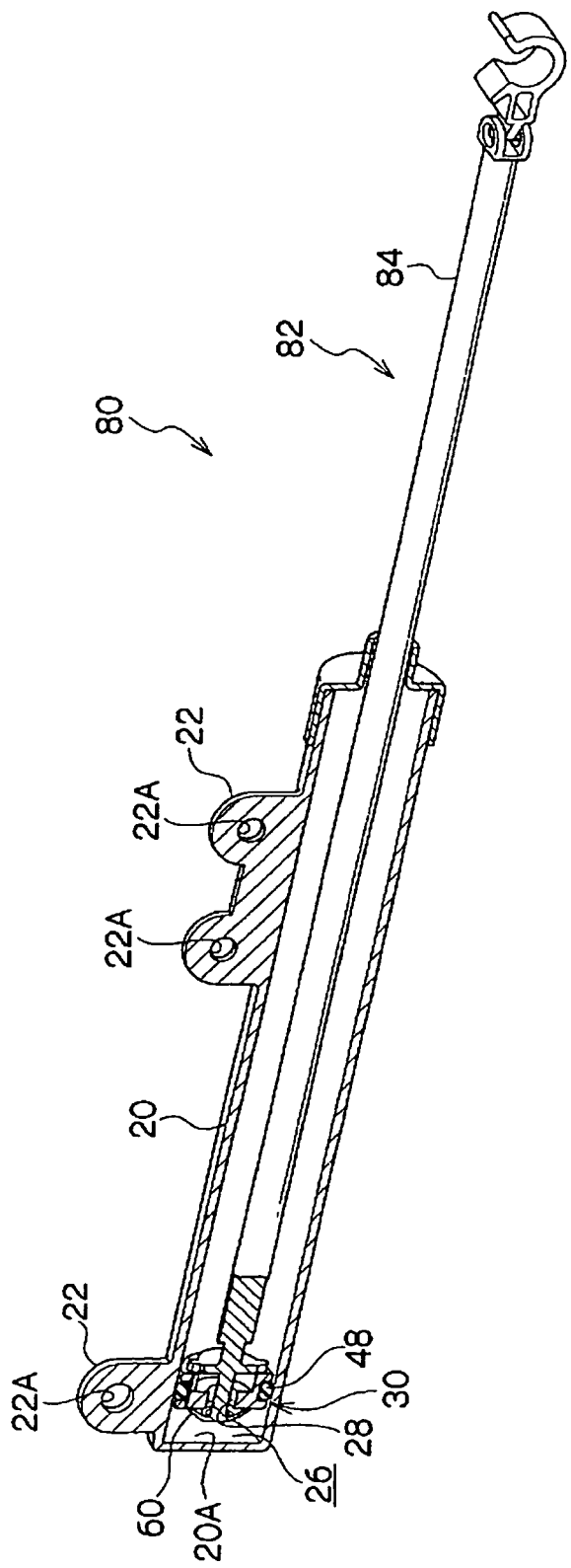
FIG. 8A is a partial cross-sectional view showing the air damper according to a second embodiment of the present invention.
Figure 8B:
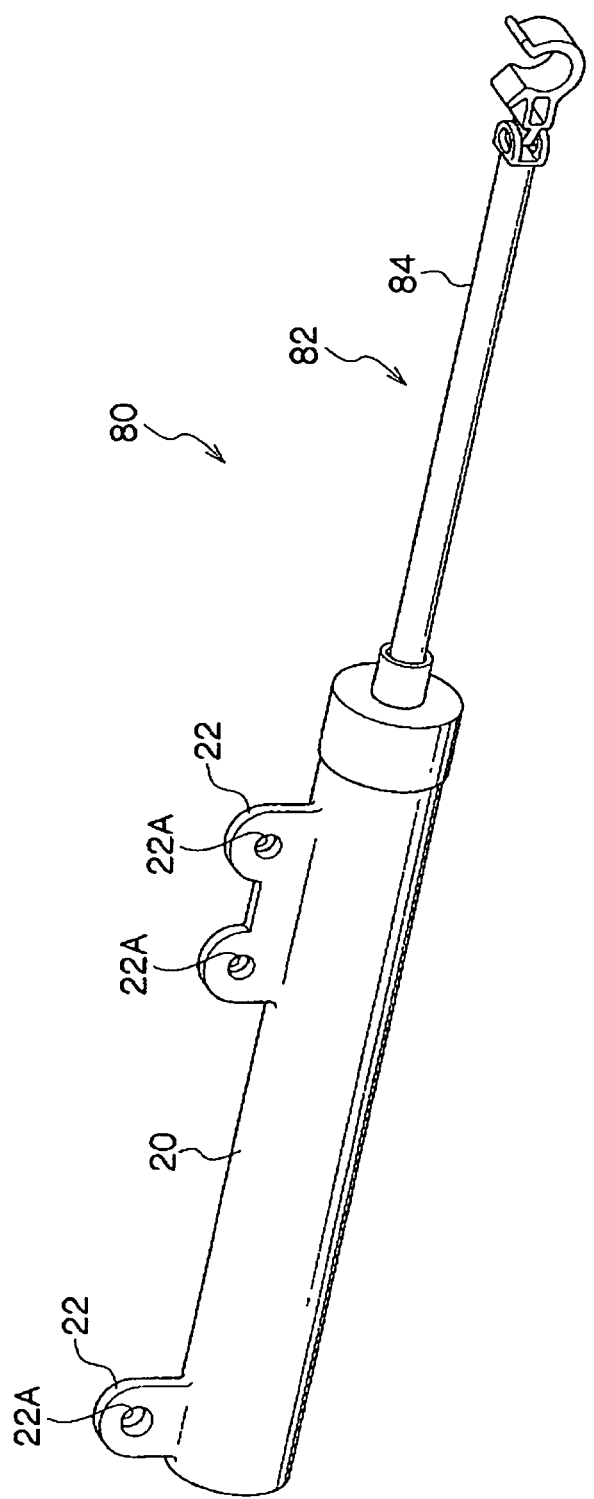
FIG. 8B is a perspective view showing the air damper according to the second embodiment of the present invention.

As shown in FIGS. 8A and 8B, in a rod member 82 of an air damper 80 of the present second embodiment, there is not provided the band portion in which a plurality of connecting members is mutually connected so as to be capable of swaying, and there is provided a columnar rod portion 84. Also, the rod portion 84 is molded by an elastic material, and can elastically deform.

Thus, the elastically deformable rod portion 84 is provided in the rod member 82 so as to be capable of moving the piston member 30 disposed inside the cylinder member 20 with a simple structure.

Incidentally, although the specific embodiment of the present invention has been explained in detail, the present invention is not limited to such embodiment, and it is obvious for those skilled in the art that the other various embodiments can be carried out within the range of the present invention. For example, in the aforementioned embodiment, although a cross-sectional surface shape of the rod portion 84 is circular, the cross-sectional surface shape may be a short shape and the like.

Next, one example of the air damper according to a third embodiment of the present invention will be explained in accordance with FIGS. 9A and 9B. Incidentally, the same symbols are assigned to the same members as the first embodiment, and their explanations are omitted.

Figure 9A:
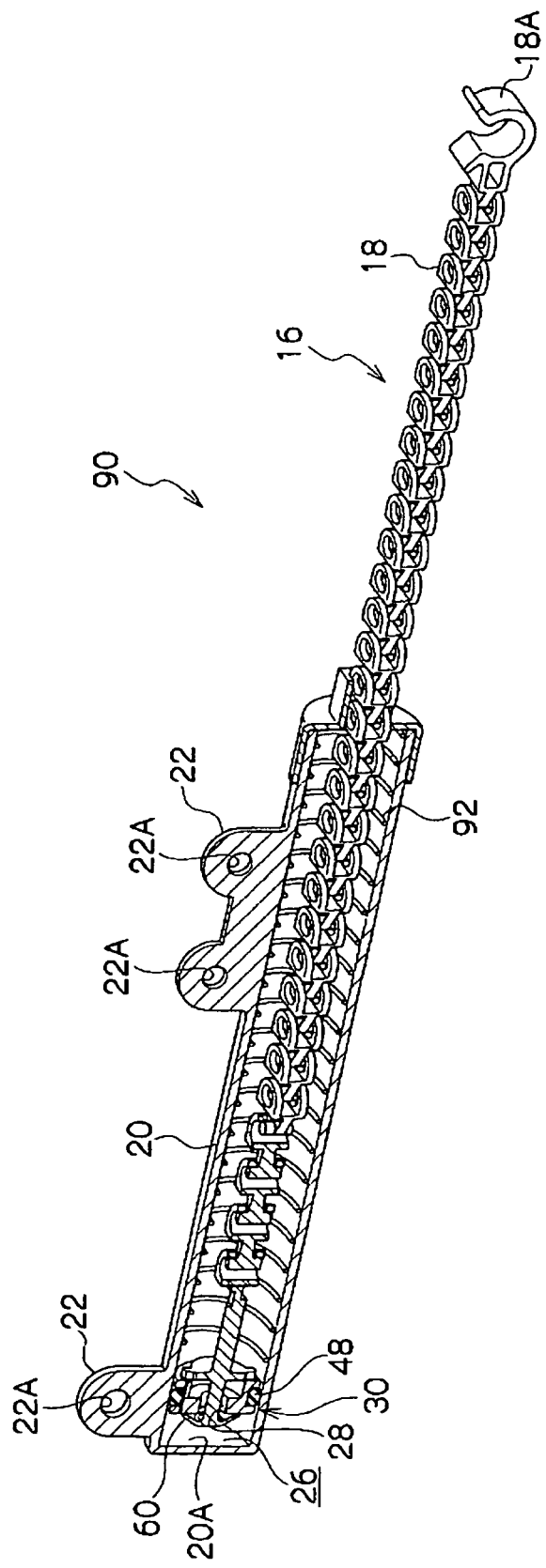
FIG. 9A is a partial cross-sectional view showing the air damper according to a third embodiment of the present invention.
Figure 9B:
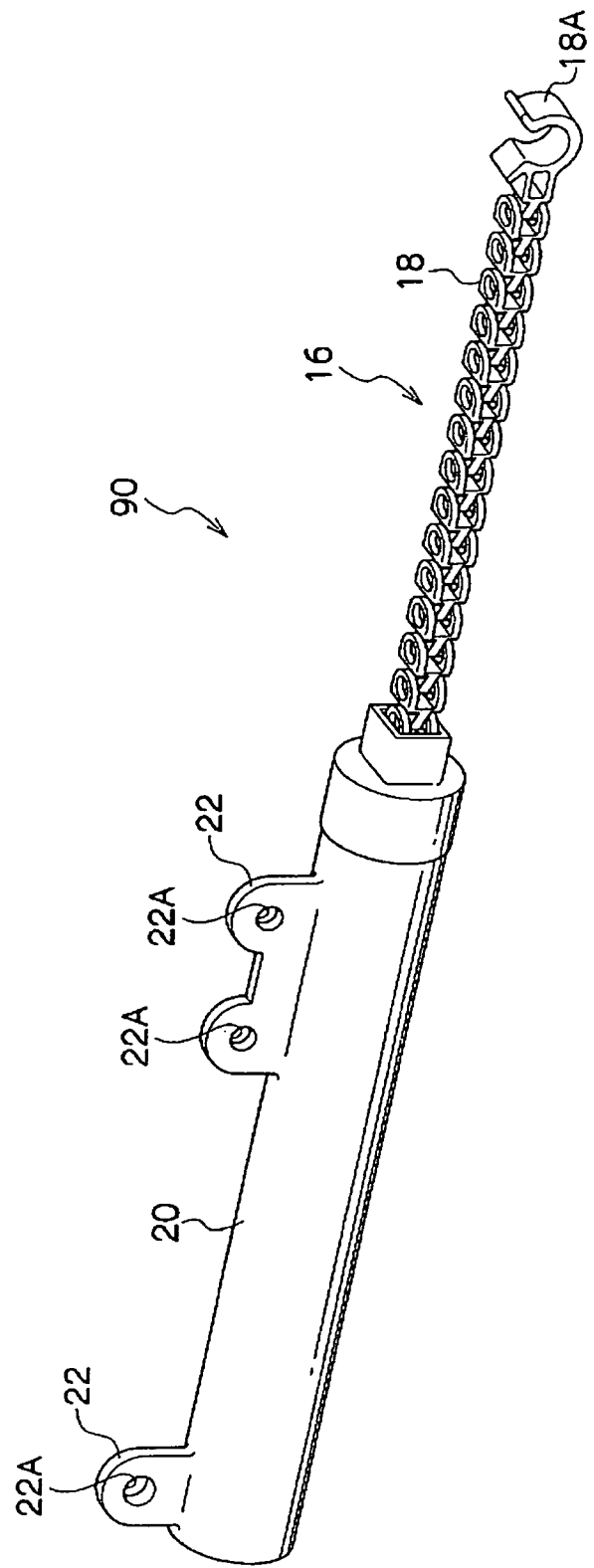
FIG. 9B is a perspective view showing the air damper according to the third embodiment of the present invention.

As shown in FIGS. 9A and 9B, inside the cylinder member 20 of an air damper 90 of the present third embodiment, there is provided a coil spring 92 urging the piston member 30 toward the bottom plate 20A of the cylinder member 20. Then, an urging force of the coil spring 92 does not allow the opening movement of the glove box 12 to halt when the glove box 12 is attempted to be opened under one's own weight. Moreover, the urging force of the coil spring 92 is determined so as to reduce the pressing force of the user when the glove box 12 is pressed in order to be closed.

Next, one example of the air damper according to a fourth embodiment of the present invention will be explained in accordance with FIGS. 10A, 10B, 11, and 12. Incidentally, the same symbols are assigned to the same members as the first embodiment, and their explanations are omitted.

Figure 10A:
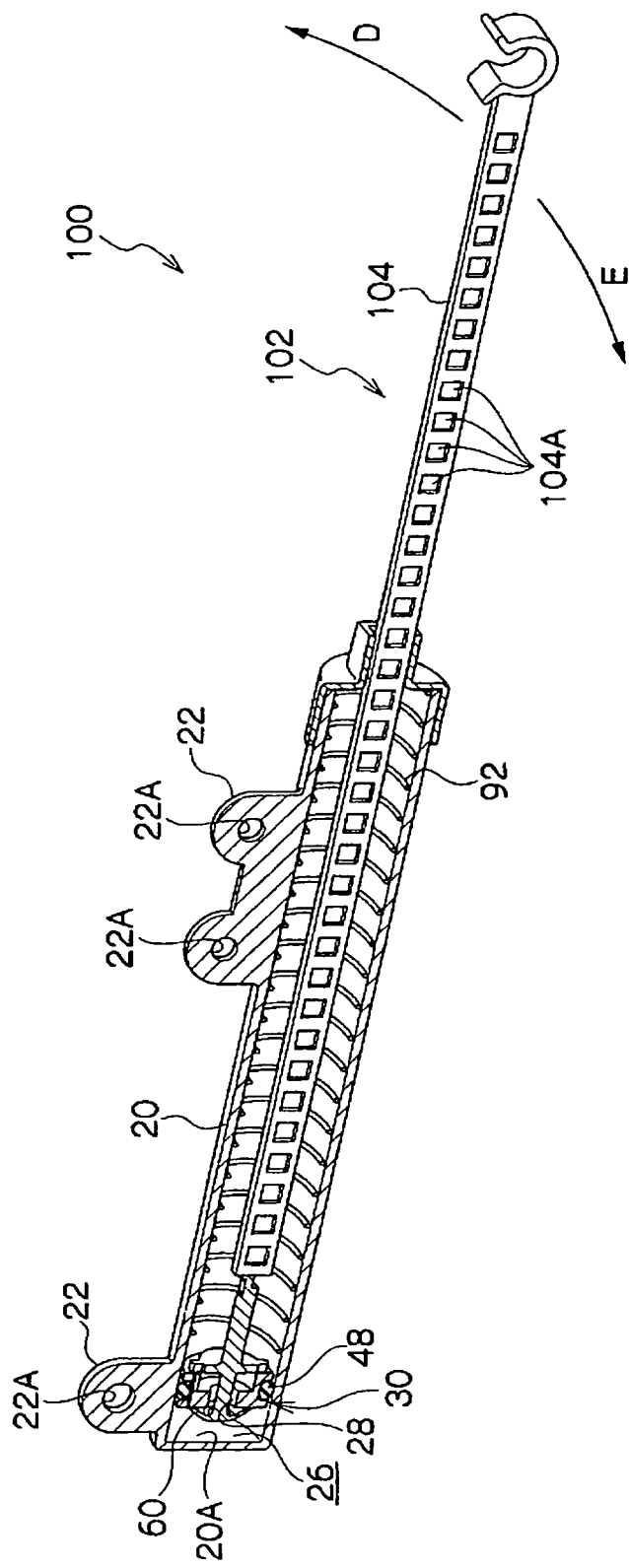
FIG. 10A is a partial cross-sectional view showing the air damper according to a fourth embodiment of the present invention.
Figure 10B:
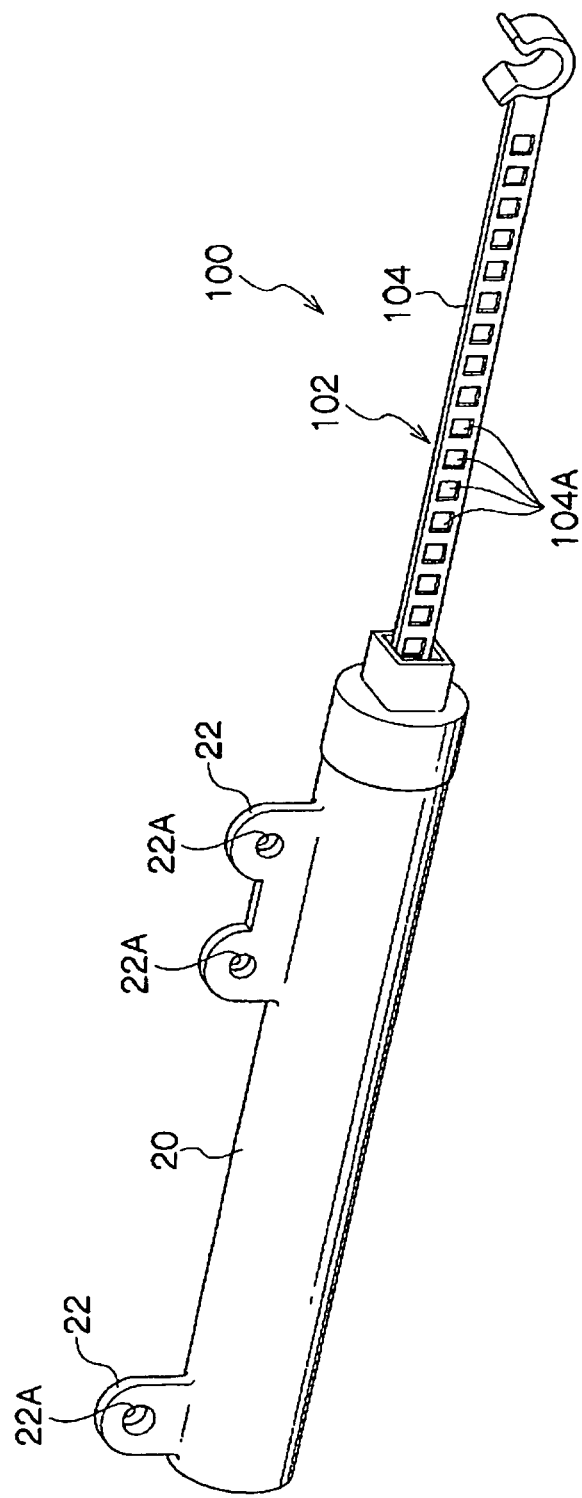
FIG. 10B is a perspective view showing the air damper according to the fourth embodiment of the present invention.

As shown in FIGS. 10A and 10B, in a rod member 102 of an air damper 100 of the present fourth embodiment, there is not provided the band portion in which a plurality of the connecting members is mutually connected so as to be capable of swaying, and there is provided an elastic deformation portion 104 capable of elastically deforming in the curved shape in a determined direction. Specifically, the elastic deformation portion 104 has a short cross-sectional surface shape, and concave and convex portions 104A continuing in a longitudinal direction are formed on a surface. Then, by making the elastic deformation portion 104 as the short cross-sectional surface shape, the elastic deformation portion 104 can elastically deform in the curved shape in an arrow D direction and an arrow E direction shown in FIG. 10A.

Figure 11:
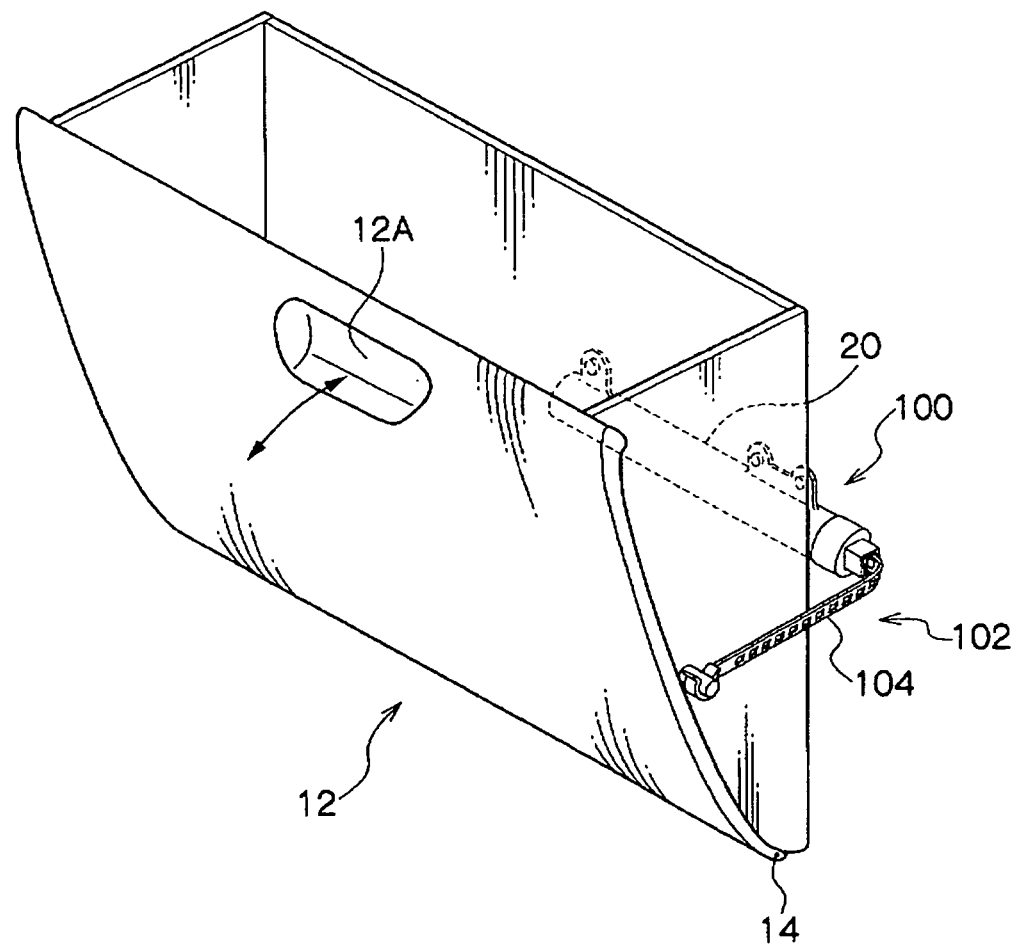
FIG. 11 is a perspective view showing the glove box in which the air damper according to the fourth embodiment of the present invention is used.
Figure 12:
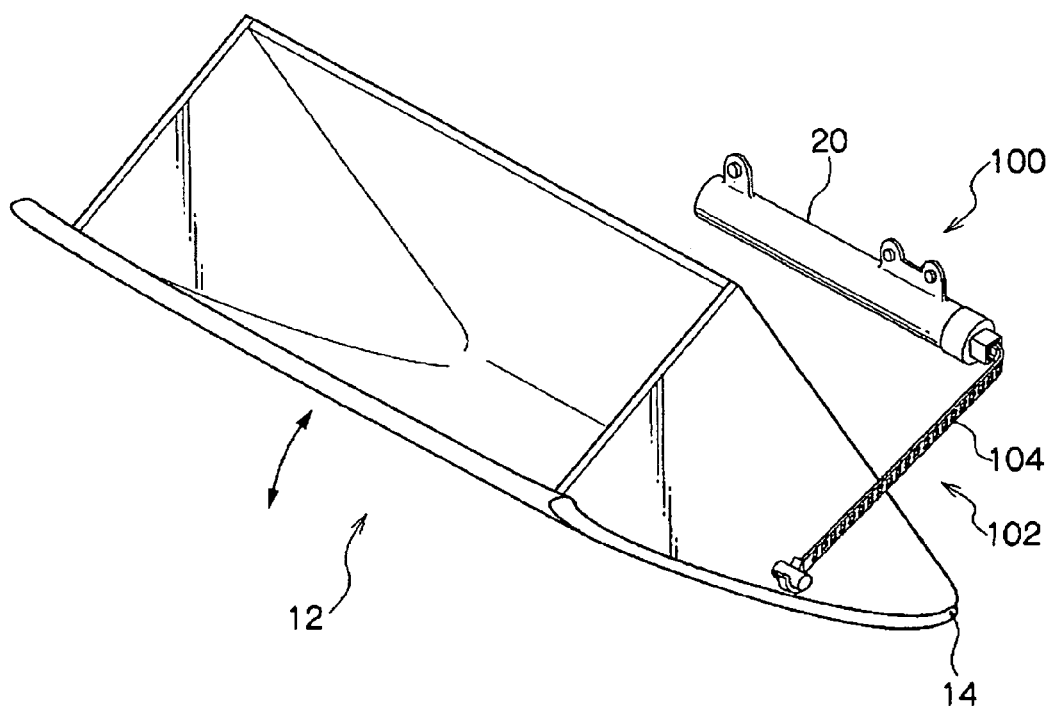
FIG. 12 is a perspective view showing the glove box in which the air damper according to the fourth embodiment of the present invention is used.

As shown in FIGS. 11 and 12, the air damper 100 is disposed along a back surface of the glove box 12, and the elastic deformation portion 104 is deformed in the curved shape, so that an end of the elastic deformation portion 104 is fixed to the glove box 12.

Thus, by providing the elastic deformation portion 104 deformable in the curved shape, the air damper 100 can be disposed along the back surface of the glove box 12, so that a degree of freedom of a placement of the air damper 100 can be improved.

EXPLANATION OF SYMBOLS 10 an air damper
16 a rod member
18 a band portion
20 a cylinder member
20A a bottom plate
24 connecting components
26 an air chamber
28 an air passage
30 a piston member
32A one member (a component)
32B the other member (a component)
42 orifice portions
44 a concave portion
48 an O-ring (a seal member)
52 push-in portions
60 a suction member
80 an air damper
82 a rod member
90 an air damper
100 an air damper
102 a rod member
104 an elastic deformation portion

What is claimed is:

1. An air damper, comprising:
   a cylinder member having a cylindrical shape and a bottom plate;
   a piston member movably provided inside the cylinder member, and forming an air chamber between the piston member and the bottom plate of the cylinder member, the piston member having an orifice portion communicating the air chamber and an outside, and an air passage in a center thereof;
   a seal member disposed in a concave portion formed in an outer periphery of the piston member, and sealing the piston member and an inner peripheral surface of the cylinder member;
   a rod member passing through the air passage formed in the piston member;
   a push-in portion provided in the rod member, the push-in portion hitting against the piston member when the rod member is pushed in toward the bottom plate of the cylinder member, to thereby move the piston member toward the bottom plate of the cylinder member; and
   a suction member provided in an end portion of the rod member, the suction member closing the air passage by hitting against the piston member when the rod member is pulled out of the cylinder member, and opening the air passage by moving away from the piston member when the push-in portion moves the piston member toward the bottom plate of the cylinder member by pushing the rod member into the cylinder member,
   wherein the orifice portion is formed between an outer peripheral surface of the piston member and an inner peripheral surface of the seal member.

2. An air damper according to claim 1, wherein the piston member comprises a plurality of components so as to be capable of being assembled from an external side of the rod member, and
   the rod member comprises a band portion in which a plurality of connecting components is mutually connected to be capable of swaying.

3. An air damper according to claim 1, wherein a cross-sectional surface of the seal member is circular, and an inner width size of the concave portion in which the seal member with the circular cross-sectional surface is disposed is made longer than a diameter size of the seal member for a crushing portion of the seal member.

4. An air damper according to claim 3, wherein the seal member is an O-ring.

5. An air damper according to claim 1, wherein the rod member comprises a band portion in which a plurality of connecting components is mutually connected so as to be capable of swaying.

6. An air damper according to claim 1, wherein the rod member comprises an elastic deformation portion which can elastically deform in a curved shape in a determined direction.

7. An air damper according to claim 1, wherein the piston member comprises a pair of semicircular members each including:
   a protruding portion protruding in a perpendicular direction to the rod member, and having a triangle claw to protrude in a parallel direction to the rod member; and
   an insertion opening disposed in the perpendicular direction to the rod member to receive the protruding portion, and having a locking opening disposed in the parallel direction of the rod member to communicate with the insertion opening,
   wherein the rod member is disposed between the pair of semicircular member, the protruding portion is inserted through the insertion opening and the triangle claw is locked in the locking opening so that the pair of semicircular members are locked to each other and the piston member is assembled with the rod member therebetween, and
   the air passage is located between the rod member and the piston member.

8. An air damper according to claim 1, further comprising an urging member urging the piston member toward the bottom plate of the cylinder member so that the urging member urges the rod member when the rod member is pulled out of the cylinder member.

9. An air damper, comprising:
   a cylinder member having a bottom plate;
   a piston member disposed slidably inside the cylinder member, and forming an air chamber between the piston member and the bottom plate of the cylinder member, the piston member having an air passage in a center thereof;
   a seal member disposed in a concave portion formed in an outer periphery of the piston member, and sealing the piston member and an inner peripheral surface of the cylinder member;

an orifice portion formed between an outer peripheral surface of the piston member and an inner peripheral surface of the seal member to communicate the air chamber and outside;

a rod member passing through the air passage formed in the piston member with a space therearound;

a push-in portion disposed on the rod member; and a suction member disposed at an end portion of the rod member, wherein the air damper is structured so that when the rod member is moved toward the bottom plate of the cylinder, the push-in portion abuts the piston member and the suction member moves away from the piston member to allow the air to pass through the air passage, and when the rod member is moved away from the bottom plate of the cylinder, the push-in portion is not abutting the piston member and the suction member abuts the piston member to close the air passage, and the orifice portion is capable of communicating the air chamber when the rod member is moved toward and away from the bottom plate of the cylinder.

\* \* \* \* \*